United States Patent

Watanabe et al.

[11] Patent Number: 6,152,627
[45] Date of Patent: Nov. 28, 2000

[54] KEYBOARD DEVICE HAVING PLURALITY OF KEYSWITCHES

[75] Inventors: Kazutoshi Watanabe; Tsuyoshi Narusawa; Yoshirou Koutaka; Kunio Hosono, all of Fukushima-ken, Japan

[73] Assignee: Alps Electric Co., Ltd., Tokyo, Japan

[21] Appl. No.: 08/896,505

[22] Filed: Jul. 1, 1997

[30] Foreign Application Priority Data

Jul. 2, 1996 [JP] Japan .................................. 8-191514

[51] Int. Cl.[7] .......................... H01H 3/12; H01H 13/70; B41J 5/14
[52] U.S. Cl. ........................ 400/495; 400/490; 200/344; 200/345
[58] Field of Search ..................... 400/472, 480, 400/481, 490, 491, 491.1, 491.2, 495, 495.1, 496; 200/5 A, 512, 513, 514, 515, 516, 517, 520, 341, 344, 345, 342, 343; 361/680

[56] References Cited

U.S. PATENT DOCUMENTS

| | | | |
|---|---|---|---|
| 962,600 | 6/1910 | Strother | 400/442 |
| 5,278,372 | 1/1994 | Takagi et al. | 200/344 |
| 5,280,147 | 1/1994 | Mochizuki et al. | 300/344 |
| 5,512,719 | 4/1996 | Okada et al. | 200/344 |
| 5,746,308 | 5/1998 | Lin | 200/344 |
| 5,894,117 | 4/1999 | Kamishima | 200/344 |
| 6,072,134 | 6/2000 | Sato et al. | 200/344 |

*Primary Examiner*—John S. Hilten
*Assistant Examiner*—Leslie J. Grohusky
*Attorney, Agent, or Firm*—Brinks Hofer Gilson & Lione

[57] ABSTRACT

A keyboard device includes a plurality of keyswitches each having a keytop movable up and down, wherein the angle of the keytop varies depending on whether the keytop is in an initial position or in a pressed position. In this structure, the keytop moves in a direction corresponding to the motion of an operator's finger and thus smooth operations can be achieved, as opposed to a conventional keyboard device in which a keytop moves vertically while maintaining itself horizontal and thus the motion of the keytop occurs in a direction different from the motion of an operator's finger.

7 Claims, 4 Drawing Sheets

KEYBOARD DEVICE HAVING PLURALITY OF KEYSWITCHES

BACKGROUND OF THE INVENTION

1. Field of the Invention

The present invention relates to a keyboard device suitable as an input/output device for use in a word processor, personal computer, or the like.

2. Description of the Related Art

FIG. 8 illustrates a keyboard device used as an input/output device. The keyboard device is constructed of various parts in the following manner. Switches are constructed with an insulating substrate 50 on which a conductor (not shown) is formed and a flexible circuit board 51 placed on the insulating substrate 50.

A supporting member 52 is made of a synthetic resin in such a manner so as to include holders 52a each having a circular hole 52b and also includes holders 52c having a rectangular hole 52d, wherein a plurality of sets of holders 52a and 52c are disposed along a plurality of lines. The supporting member 52 is placed on the circuit board 51.

One end of a first operating member 53 is slidably fit into the hole 52d, and one end of a second operating member 54 is pivotably fit into the hole 52b. The first and second operating members 53 and 54 are connected to each other via a shaft 55 so that they cross each other.

A keytop 56 is made of a synthesis resin in such a manner so as to have a supporting member 56a including a circular hole 56b and also have a supporting member 56c including a rectangular hole 56d. The other end of the first operating member 53 is fit into the hole 56b and the other end of the second operating member 54 is fit into the hole 56d so that the keytop 56 is held on the first and second operating members 53 and 54.

A plurality of sets of one keytop 56 and first and second operating members 53 and 54 constructed in the above-described manner are disposed along a plurality of lines. A plurality of dome-shaped elastic members 57 made of electrically insulating rubber are disposed on the circuit board 51 in such a manner that one elastic member 57 is located under each set of first and second operating members 53 and 54.

As described above, each keyswitch is constructed with one pair of first and second operating members 53 and 54, one keytop 56, and one elastic member 57. Although not shown in FIG. 8, a plurality of similar keyswitches are disposed along a plurality of lines.

As shown in FIG. 9, the first and second operating members 53 and 54 are formed in such a manner that the distance Y from the shaft 55 to any end of the operating members is equal.

If the keytop 56 of a certain keyswitch having the above structure is pressed, the ends of the first and second operating members 53 and 54 are, as can be seen from FIG. 8, pressed by the keytop 56. As a result, the first and second operating members 53 and 54 connected to each other via the shaft 55 at their center are moved in such a manner that one end of the first operating member 53 slides in the hole 52d of the supporting member 52c while the other end turns in the hole 56b of the supporting member 56a, and, similarly, one end of the second operating member 54 turns in the hole 52b of the supporting member 52a while the other end slides in the hole 56d of the supporting member 56c. Thus, the keytop 56 moves downward while maintaining itself horizontal.

The elastic member 57 is thus pressed by the first and second operating members 53 and 54, and finally the dome-shaped elastic member 57 is inverted in shape. As a result, the circuit board 51 is pressed by the elastic member 57 and comes in contact with the conductor disposed on the insulating substrate 50. Thus, the switch is turned on.

If the pressing force against the keytop 56 is removed, the first and second operating members 53 and 54 and the keytop 56 are pushed back by the elastic force of the elastic member 57 to their original positions where they were located before being pressed. The pressure by the elastic member 57 against circuit board 51 is released and the circuit board 51 returns to its original position by its own restoring force. As a result, the contact between the circuit board 51 and the conductor on the insulating substrate 50 is released and thus the switch is turned off.

The motion of the keytop 56 during the switching operation will be described in further detail below referring to FIGS. 9 and 10. FIG. 9 illustrates the keytop 56 in the original position before being pressed, and FIG. 10 illustrates the keytop 56 in the pressed position. The keytop 56 is supported by the first and second operating members 53 and 54 wherein the first and second operating members 53 and 54 are formed in such a manner, as described above, that the distance Y from the shaft 55 to any end of the operating members is equal.

Therefore, if the keytop 56 is pressed when it is in the original position as shown in FIG. 8, the keytop 56 moves downward from the original position while maintaining itself horizontal. When the keytop 56 stops at its pressed position as shown in FIG. 10, the keytop 56 is still horizontal as is in the original position.

In general, keyboard devices include a plurality of keyswitches located along a plurality of lines. In operation, an operator puts his/her fingers on keyswitches in a central line, and moves a particular finger onto a desired keyswitch in another line located nearer to or farther from the operator so as to press the keyswitch.

When an operator presses a keyswitch in a line nearer to the operator, the keyswitch is most likely pressed in a direction denoted by an arrow P1 in FIG. 8. On the other hand, when a keyswitch in a line farther from the operator is pressed, it is most likely that the keyswitch is pressed in a direction P2.

As described above, the pressing position on a keytop and the direction in which the keytop is pressed vary depending on whether the keyswitch is located in a near line or a far line. However, in the conventional keyboard device, when a keytop 56 is pressed, it moves downward from its original position to the final pressed position while maintaining itself horizontal, and thus keytop motion occurs in a direction different from the direction in which the keytop is pressed. This can cause stiffness in the operation of the keytop 56. Thus there is a need for an improved keyboard device which can be operated more smoothly.

SUMMARY OF THE INVENTION

The problem in the conventional techniques is solved by the present invention having various aspects as described below.

According to a first aspect of the invention, there is provided a keyboard device including a plurality of keyswitches each having a keytop movable up and down, wherein the angle of the keytop varies depending on whether the keytop is in an initial position or in a pressed position.

According to a second aspect of the invention, a plurality of keyswitches are disposed along each of a plurality of lines, and the angle of the keytop of at least those keyswitches located along one of lines varies depending on whether the keytop is in an initial position or in a pressed position.

According to a third aspect of the invention, the amounts of change in the angle of the back sides of keytops located nearer to a human operator are greater than those of the front sides of the keytops and the amounts of change in the angle of the front sides of keytops located farther from the human operator are greater than those of the back sides of the keytops in which the front side is defined as the side directly facing the human operator and the back side is defined as the side opposite to the front side.

According to a fourth aspect of the invention, the amount of change in the angle of the keytop varies from line to line.

According to a fifth aspect of the invention, there is provided a keyboard device including a keyswitch composed of: a first operating member one end of which is slidably held by a supporting member and the other end of which is pivotably held by a keytop; and a second operating member one end of which is pivotably held by the supporting member and the other end of which is slidably held by the keytop, the first and second operating members being combined via a shaft into a crossing form, wherein when the distance from one end of the first operating member to the shaft is defined as a first distance, the distance from the other end of the first operating member to the shaft is defined as a second distance, the distance from one end of the second operating member to the shaft is defined as a third distance, and the distance from the other end of the second operating member to the shaft is defined as a fourth distance, at least the first distance is different from the third distance.

DESCRIPTION OF THE PREFERRED EMBODIMENTS

Referring to FIGS. 1–7, an embodiment of a keyboard device according to the invention will be described below.

Figure 1:
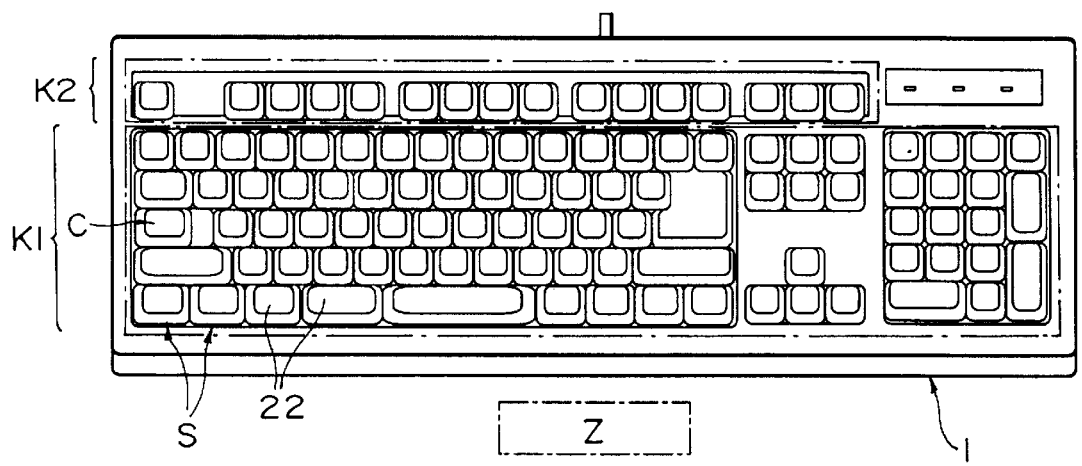
FIG. 1 is a plan view of a keyboard device according to the invention.
Figure 2:
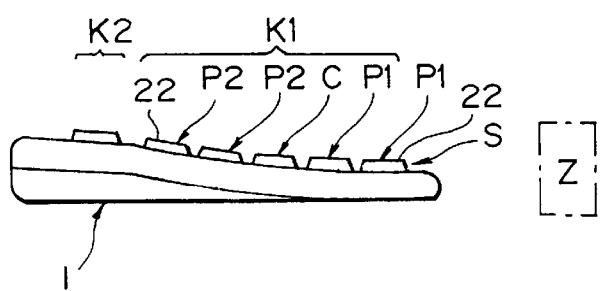
FIG. 2 is a side view of the keyboard device according to the invention.

As shown in FIGS. 1 and 2, the keyboard device is formed in an enclosure in such a manner that the height of keyswitches increases with their location relative to the operator side Z. A plurality of keyswitches S are disposed on the upper surface of the enclosure 1 along a plurality of lines. The keyswitches S are divided into two groups: input keyswitches K1 and function keyswitches K2.

Figure 3:
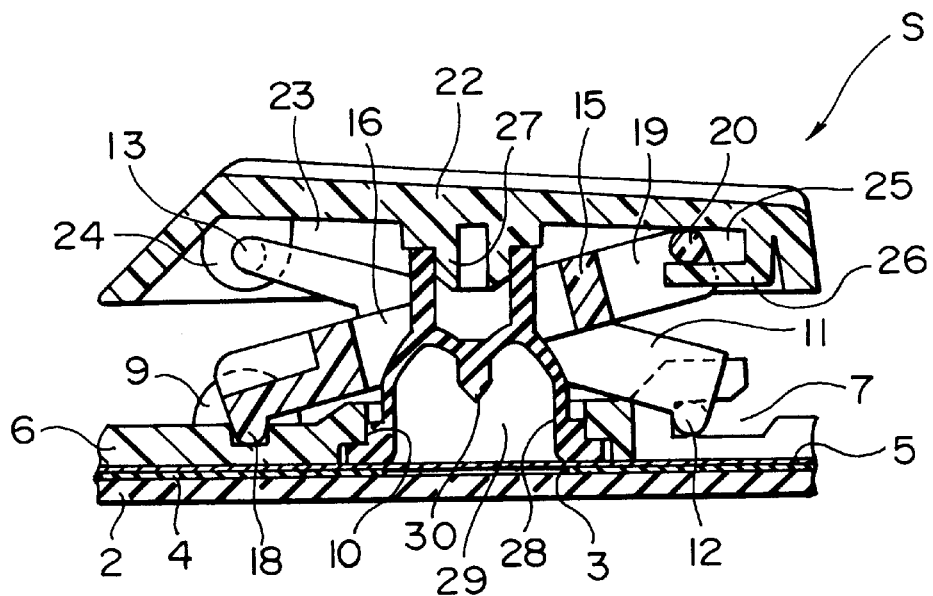
FIG. 3 is a vertical sectional view illustrating the main parts of a keyswitch of the keyboard device according to the invention.
Figure 4:
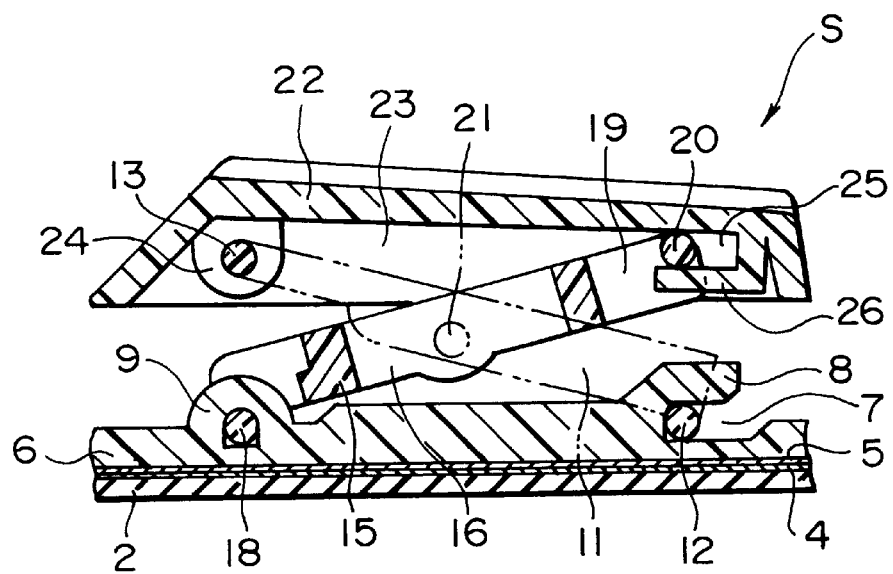
FIG. 4 is a vertical sectional view illustrating the main parts of the keyswitch of the keyboard device according to the invention.
Figure 5:
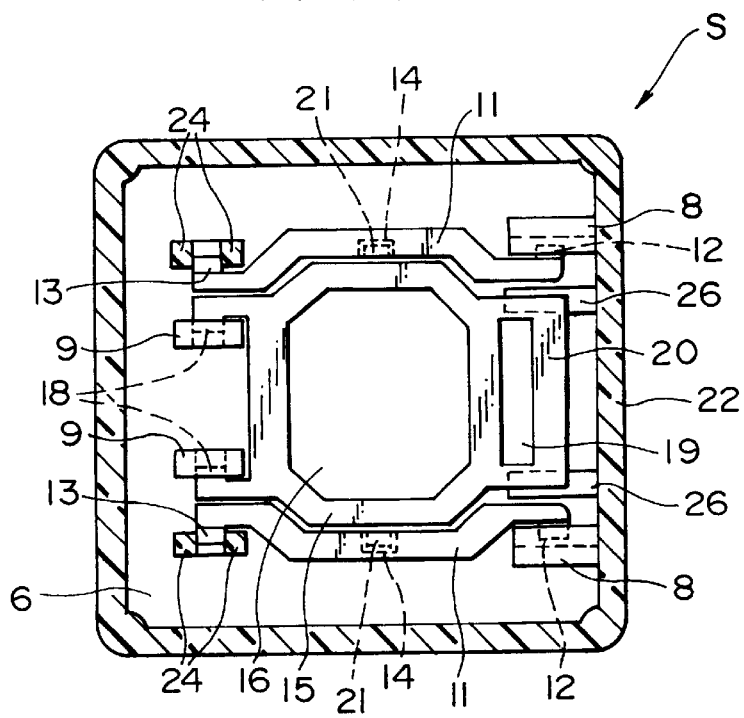
FIG. 5 is a horizontal sectional view of the keyswitch of the keyboard device according to the invention.

Furthermore, as shown in FIGS. 1–3, the keyboard device also includes as many switches as there are keyswitches S wherein each switch is constructed by placing a circuit board 5 in the form of a flexible plate, via a spacer 4 made of an insulating material having a hole 3, on an insulating substrate 2 on which a conductor (not shown) is formed.

A supporting member 6 is made of a synthesis resin in such a manner so as include two holders 8 spaced from each other and having a slot 7 extending in a horizontal direction, and also includes two holders 9 formed at locations spaced from each other and opposite to the holders 8. One set of holders 8 and 9 is formed for each keyswitch S.

The supporting member 6 further has holes 10 formed at locations corresponding to the respective keyswitches S, between the holders 8 and 9. The supporting member 6 is securely placed on the circuit board 5.

A pair of first operating members 11 is made of a synthesis resin in such a manner so as to have projections 12 and 13 at both ends of each operating member and also have a hole 14 between the projections 12 and 13 wherein the projection 12 formed on one end is fit into the slot 7 of the supporting member 6 so that the projection 12 is slidably held by the holder 8.

A second operating member 15 is made of a synthesis resin into a generally square shape in such a manner that a large-sized hole 16 is formed in the center of the second operating member 15, circular connecting pins 18 are formed on one end, a hole 19 is formed in a part on the other end thereby forming a connecting bar 20, and shafts 21 projecting outward are formed between one end and the other end of the second operating member 15.

Each second operating member 15 is placed between a pair of first operating members 11 so that the shafts 21 are fit into the corresponding holes 14 thereby combining the first and second operating members in such a manner that they cross each other. The connecting pins 18 formed on one end of the second operating member 15 are pivotably fit into the holders 9 of the supporting member 6.

Each keytop 22 is made of a synthesis resin into a boat shape. The keytop 22 has a cavity 23 in which there are provided holders 24 having a pair of holes formed on one end of the cavity 23, holders 26 having a slot 25 made up of an L-shaped projecting material and located on the other end of the cavity 23, and a protruding part 27 formed at the center of the cavity 23.

The projection 13 formed on the other end of the first operating member 11 combined into the crossing form is pivotably fit into the holder 24 of the keytop 22. The connecting bar 20 on the other end of the second operating member 15 is fit into the slot 25 of the keytop 22 so that the connecting bar 20 is slidably supported by the holder 26. One keytop 22 having the above structure is provided for each keyswitch S in such a manner that the keytop 22 can move up and down.

As shown in FIG. 3, a dome-shaped elastic member 28, made of electrically insulating rubber and having a projection 30 formed in a cavity 29, is placed in the hole 10 of the supporting member 6 wherein one end of the elastic member 28 is held between the supporting member 6 and the circuit board 5 and the other end receives the protruding part 27 of the keytop 22 so that the keytop 22 is always pushed up by the elastic force of the elastic member 28.

Each keyswitch S has its own elastic member 28 and thus one keyswitch S is constructed with one set of first and second operating members 11 and 15, one keytop 22, and one elastic member 28.

Figure 6:
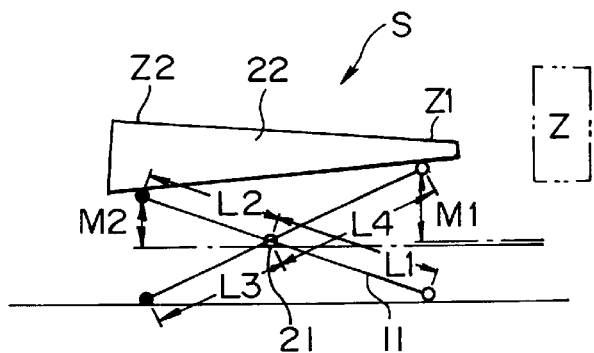
FIG. 6 is a schematic diagram illustrating the motion of a keytop of the keyboard device according to the invention.

In an embodiment of the invention, as shown in FIG. 6, the keyswitch structure is designed such that L1>L2, L3<L4, L1=L4, and L2=L3 where L1 is the first distance between one end of the first operating member 11 and the shaft 21, L2 is the second distance between the other end of the first operating member 11 and the shaft 21, L3 is the third distance between one end of the second operating member 15 and the shaft 21, and L4 is the fourth distance between the other end of the second operating member 15 and the shaft 21.

The operation of the keyboard device constructed in the above-described manner will be described below.

If a keytop 22 is pressed against the elastic force of the elastic member 28, the elastic member 28 is gradually deformed and the dome-shaped elastic member 28 is finally inverted in shape. As a result, the circuit board 5 is pressed by the projection 30 against the conductor formed on the insulating substrate 2, and thus the switch is turned on.

During the above operation, rotation occurs between the shaft 21 and the hole 14, between the projection 13 and the holder 24, and between the connecting pin 18 and the holder 9, while sliding occurs between the projection 12 and the holder 8 and between the connecting bar 20 and the holder 26, and thus the first and second operating members 11 and 15 move down toward the supporting member 6.

Figure 7:
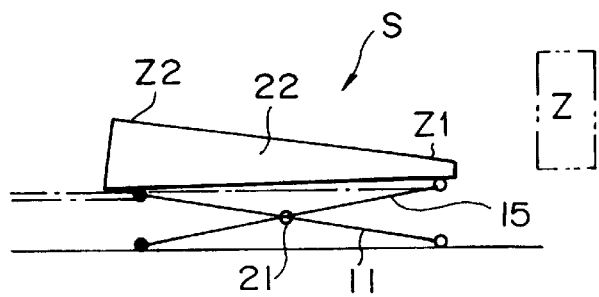
FIG. 7 is a schematic diagram illustrating the motion of the keytop of the keyboard device according to the invention.
Figure 8:
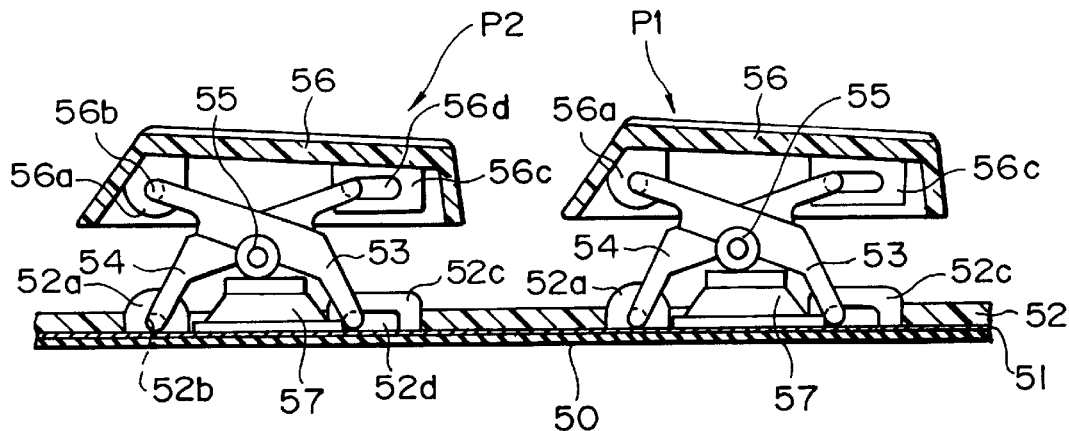
FIG. 8 is a vertical sectional view illustrating the main parts of a keyboard device according to a conventional technique.
Figure 9:
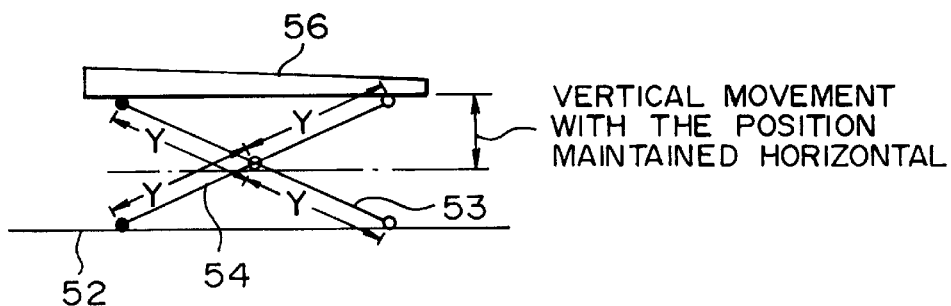
FIG. 9 is a schematic diagram illustrating the motion of a keytop of the keyboard device according to the conventional technique.
Figure 10:
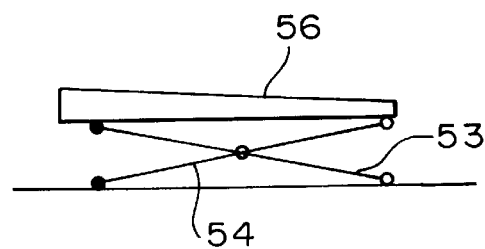
FIG. 10 is a schematic diagram illustrating the motion of the keytop of the keyboard device according to the conventional technique.

The above operation will be described in further detail below with reference to FIGS. 6 and 7. FIG. 6 illustrates the initial position of the keytop 22 before being pressed. FIG. 7 illustrates the pressed position of the keytop 22 being pressed. Since the first and second operating members 11 and 15 are formed such that the condition in terms of the distances between the respective ends and the shaft 21 given by L1 (first distance)=L4 (fourth distance)>L2 (second distance)=L3 (third distance) is satisfied, the movement M1 of the keytop's front side Z1 facing the operator side Z becomes greater than the movement M2 of the back side Z2 opposite to the front side Z1. As a result, the keytop 22 in the pressed position has a certain angle relative to the initial position of the keytop 22.

The angle of the keytop 22 in the pressed position relative to the initial position is produced by the difference between the movements M1 and M2, which results from the difference between L1 and L3.

If the pressure against the keytop 22 is removed, the keytop 22 and the first and second operating members 11 and 15 are pushed back by the elastic force by the elastic member 28, and the elastic member 28 itself returns into the original state. Thus, the circuit board 5 returns to its original position by the restoring force of the circuit board itself. As a result, the contact between the circuit board 5 and the conductor formed on the insulating substrate 2 is released, and thus the switch is turned off.

As opposed to the above embodiment in which the first and second operating members 11 and 15 are formed such that the distances between the respective ends and the shaft 21 meet the condition L1=L4>L2=L3, if the first and second operating members 11 and 14 are formed such that L1=L4<L2=L3, then, although not shown in the figures, the movement M1 of the keytop's front side Z1 facing the operator size Z becomes smaller than the movement M2 of the back side Z2 of the keytop. Furthermore, by properly controlling the difference between distances L1 and L3, it is possible to make a fine adjustment in terms of the angle or the slanting degree of the keytop 22 in the pressed position relative to the initial position.

The keyboard device generally has keytops 22 arranged as shown in FIG. 1 or 2. In operation, an operator puts his/her fingers on the keytops of some input keyswitches K1 in the center line C, and moves some finger so as to press a particular keytop in the center line C or in a line located nearer to or otherwise farther from the operator side Z.

In the above operation, as shown in FIG. 2, the keytops 22 in the center line C are likely pressed down in a vertical direction, and those keytops 22 in a line nearer to the operator side Z are likely pressed in a direction P1. On the other hand, the keytops 22 in a line located farther from the operator side Z are likely pressed in a direction P2.

Therefore, if the keyswitches S in lines located farther from the operator side Z are designed such that L1>L3 and the keyswitches S in lines nearer to the operator side Z are designed such that L1<L3, then the motion of the keytops 22 occurs in directions corresponding to the motion of operator's fingers and thus smooth operations can be achieved.

Alternatively, the keyswitches may also be designed such that L1≠L3 even for the center line C. Furthermore, the difference between L1 and L3 may be varied from line to line so that the motion of the keytops 22 are adjusted in a finer fashion.

In the present invention, as described above, keyswitches are constructed such that when a keytop is pressed, the keytop moves downward to a pressed position having a certain angle relative to its original position. This allows the keytop to move in a direction corresponding to the motion of an operator's finger, and thus smooth operation can be achieved.

The difference in angle between the initial position and the pressed position of the keytop may be introduced at least for keyswitches located in one of lines. Or the keyswitches may be designed such that a greater difference in angle of the keytop position is introduced for lines nearer to or farther from the operator. Otherwise, the difference in angle of the keytop position is varied from line to line so that the motion of the keytops is controlled more precisely thereby achieving smoother keyswitch operations.

The above features and advantages of the invention are achieved by introducing a difference between the first and third distances of the first and second operating members combined into a crossing form. Thus, the present invention provides a high-performance keyboard device at a low cost in which the angle of the keytop is varied depending on its position and the amount of change in the angle can be controlled precisely with a simple structure.

What is claimed is:

1. A keyboard device comprising a plurality of keyswitches each having a keytop movable up and down and including a first operating member one end of which is slidably held by a supporting member and another end of which is pivotably held by a keytop; and a second operating member one end of which is pivotably held by the supporting member and another end of which is slidably held by the keytop, said first and second operating members being combined via a shaft into a crossing form, wherein when the distance from said one end of said first operating member to said shaft is defined as a first distance, the distance from said another end of said first operating member to said shaft is defined as a second distance, the distance from said one end of said second operating member to said shaft is defined as a third distance, and the distance from said another end of said second operating member to said shaft is defined as a fourth distance, at least said first distance is different from said third distance, wherein the angle of said keytop varies depending on whether said keytop is in an initial position or in a pressed position, the first distance and the third distance are different from each other, wherein the first distance is equal to the fourth distance, and wherein the second distance is equal to the third distance.

2. A keyboard device according to claim 1, wherein a plurality of said keyswitches are disposed along each of a plurality of lines, and the angle of the keytop of at least those keyswitches located along one of the lines varies depending on whether said keytop is in an initial position or in a pressed position by making at least the first distance and the third distance different from each other.

3. A keyboard device according to claim 2, wherein the amount of change in the angle of the keytop varies from line to line by making at least the first distance and third distance different from each other.

4. A keyboard device according to claim 2, wherein in said keytops located farther from the operator, the first distance is larger than the third distance, whereby the amounts of change in the angle of the front sides of keytops as seen from the operator are greater than those of the back sides of keytops as seen from the operator, and wherein in said keytops located nearer to the operator, the third distance is larger than the first distance, whereby the amounts of change in the angle of the back sides of keytops as seen from the operator are greater than those of the front sides of keytops as seen from the operator.

5. A keyboard device according to claim 1, wherein the amount of change in the angle of the keytop varies from line to line by making at least the first distance and third distance different from each other.

6. A keyboard device according to claim 1, wherein in said keytops located farther from the operator, the first distance is larger than the third distance, whereby the amounts of change in the angle of the front sides of keytops as seen from the operator are greater than those of the back sides of keytops as seen from the operator, and wherein in said keytops located nearer to the operator, the third distance is larger than the first distance, whereby the amounts of change in the angle of the back sides of keytops as seen from the operator are greater than those of the front sides of keytops as seen from the operator.

7. A keyboard device according to claim 6, wherein the amount of change in the angle of the keytop varies from line to line by making at least the first distance and third distance different from each other.

* * * * *